US007996543B2

(12) United States Patent
Smelyansky et al.

(10) Patent No.: US 7,996,543 B2
(45) Date of Patent: Aug. 9, 2011

(54) CLIENT-TO-CLIENT DIRECT RTP EXCHANGE IN A MANAGED CLIENT-SERVER NETWORK

(75) Inventors: Vladimir Smelyansky, Glenview, IL (US); Victor Grinberg, Buffalo Grove, IL (US)

(73) Assignee: XCASTLABS, Los Angeles, CA (US)

( * ) Notice: Subject to any disclaimer, the term of this patent is extended or adjusted under 35 U.S.C. 154(b) by 45 days.

(21) Appl. No.: 12/192,906

(22) Filed: Aug. 15, 2008

(65) Prior Publication Data

US 2009/0077245 A1  Mar. 19, 2009

Related U.S. Application Data

(60) Provisional application No. 60/935,500, filed on Aug. 16, 2007.

(51) Int. Cl.
G06F 15/16 (2006.01)
G06F 15/173 (2006.01)
(52) U.S. Cl. .................. 709/228; 709/225; 709/229
(58) Field of Classification Search .................. 709/231, 709/238, 225–228
See application file for complete search history.

(56) References Cited

U.S. PATENT DOCUMENTS

| | | | | |
|---|---|---|---|---|
| 6,026,430 A * | 2/2000 | Butman et al. | ................ | 709/203 |
| 6,154,839 A * | 11/2000 | Arrow et al. | ................ | 713/154 |
| 6,173,399 B1 * | 1/2001 | Gilbrech | ................ | 713/153 |
| 6,212,558 B1 * | 4/2001 | Antur et al. | ................ | 709/221 |
| 6,304,973 B1 * | 10/2001 | Williams | ................ | 726/3 |
| 6,374,298 B2 * | 4/2002 | Tanno | ................ | 709/227 |
| 6,453,419 B1 * | 9/2002 | Flint et al. | ................ | 726/3 |
| 6,484,257 B1 * | 11/2002 | Ellis | ................ | 713/153 |
| 6,631,416 B2 * | 10/2003 | Bendinelli et al. | ................ | 709/227 |
| 6,693,878 B1 * | 2/2004 | Daruwalla et al. | ................ | 370/235 |
| 6,697,354 B1 * | 2/2004 | Borella et al. | ................ | 370/352 |
| 7,685,309 B2 * | 3/2010 | Caronni et al. | ................ | 709/238 |

* cited by examiner

*Primary Examiner* — Hussein A Elchanti
(74) *Attorney, Agent, or Firm* — Murphy & King, P.C.

(57) ABSTRACT

A method for establishing a data packet exchange communication session that allows the exchange of data packets between an originating client and a destination client in a data network having a client-server arrangement is provided. An originating client transmits communications session request data message to a communications management server via a first temporary signaling communications path. The communications session request data message contains at least a unique network address of a destination client. The communications management server, upon determining that said originating client is residing behind a first network firewall, determining whether said first network firewall will allow exchange of data packets between said originating client and any other client not residing behind said first network firewall. If it is determined that the first network firewall will allow exchange of data packets between said originating client and any other client not residing behind the first network firewall, the communications management server retrieves relationship information between said unique network address of said originating client and said unique network address of a first network firewall port and a first network firewall port identity, and establishes a data packet exchange communications session with said communications management server through said first network firewall. Otherwise, said communications management server, upon receiving a media packet communications session request data message from said originating client via said first temporary signaling communications path establishes a media packet exchange session with said originating client via said first network firewall.

50 Claims, 8 Drawing Sheets

CLIENT-TO-CLIENT DIRECT RTP EXCHANGE IN A MANAGED CLIENT-SERVER NETWORK

CROSS REFERENCE TO RELATED APPLICATIONS

The present application claims priority to U.S. provisional application No. 60/935,500, filed Aug. 16, 2007, entitled "Client-To-Client Direct RTP Exchange In A Managed Client-Server Network," the contents of which are hereby incorporated by reference herein in their entirety.

FIELD OF THE INVENTION

This invention relates to the field of digital media communications. More particularly, this invention relates to the management of communications sessions between real-time protocol (RTP) media-handling clients in a data network implemented with client-server network architecture.

BACKGROUND OF THE ART

In the current state of the art, a managed client-server network uses communications servers to manage RTP media packet exchange between network clients. In a simplified example of a representative process of current art practices, it can be seen that the server not only manages the process of establishing a communications session between clients, but also handles each of the high volume of RTP media packets exchanged between the clients (during the communications session between the clients). This is expensive both in terms of network bandwidth and server usage efficiency.

An improved approach would be a scheme where the communications server does not need to handle each of the RTP media packets being exchanged between communicating clients. In a public network (without the inclusion of firewalls), this can be accomplished simply by providing the clients with one another's network address, and then allowing the clients to communicate (exchange RTP media packets) directly with one another, without passing the packets through the communications server.

When a well-known firewall or network address translator (NAT) resides between the one or both clients and the communications server, the direct exchange of RTP media packets between clients can be a more complex process.

SIMPLIFIED CURRENT ART EXAMPLE

The following is a simplified example of state of the art client-server-client communications processes, wherein each client passes all communications packets (including RTP media packets) through the server to the other client:

This process can work even if a firewall exists between a client and the communications server, as long as the firewall allows communications between the communications server and the client that resides 'behind' the firewall.

1. An originating client transmits a signaling message that contains a request to the server for establishment of a communication session with a destination client. In sending this request, the originating client must establish a communications session with the server.
2. The server receives the request from the originating client, and examines the session information contained in the request. This information contains, in part:
   a) The identity (network address) of the originating client.
   b) The communications port (of the device on which the originating client is operating) through which it is communicating.
   c) The identity of the target destination client with which the originating client requests a communications session. The server usually knows the network address that maps to the provided identity, based on entries in an internal database.
3. The server enters into a communications session with the originating client, thereby transmitting 'signaling' data packets to, and receiving 'signaling' data packets from, the originating client.
4. In order to establish communications between the originating client and the target destination client, the server attempts to establish a communications session with the destination client.
5. When the server successfully establishes a communications session with the destination client, both clients begin to exchange information data packets (RTP media packets in this example).
6. The server handles the exchange of each information data packet between the clients by receiving the packet from the sending client, and then re-transmitting the packet to the receiving client.

The session-initiation process includes the exchange of signaling messages (containing connection request and client identity information) between the server and the involved clients. The total volume of data packets exchanged between the client and the server during the session initiation process is relatively small, typically comprising only several data packets. However, there is a very large volume of RTP media packets exchanged during a communications session between two media-handling clients. In the current art, when two media-handling clients are connected through a server, the server must handle not only the session-initiation data packets, but also all of the RTP media data packets exchanged between the communicating clients.

In the prior art, when a server enables the exchange of RTP media data packets between two clients using the process described above, the classic two-legged communications link is established (from the first client to the server representing one leg, and from the server to the second client representing the second leg). This communications link arrangement is costly from a network bandwidth usage standpoint. The server's input and output data capacity is burdened with the RTP media data packet load of both legs of the link. Additionally, the RTP media data packet traffic exchanged between the clients must necessarily use up bandwidth in the data links between each client and the server. In many applications (VoIP, for instance) the bandwidth usage applies in both directions of packet flow to handle real-time transfer of voice (RTP media) data packets.

In some cases (i.e. VoIP), there can also be individual voice response units (VRUs) used in the server architecture for handling voice call processing. Like any other network element, these are a limited resource through which network traffic flows. If all of the RTP media packets are required to pass through the server for any portion of a voice call, then the VRU responsible for handling that voice call is unavailable for handling other calls during that time. So, in the prior art, where two leg of a communications link meet at the server, two VRUs are tied up during the portion of the call where the clients are exchanging RTP media packets through the server.

When neither client is 'behind' a network firewall/NAT, once the server has established a communications session with each client individually, the server can simply instruct the clients to exchange RTP media packets directly with one another, rather than through the server.

However, if either client resides 'behind' a firewall/NAT, and the communications server relays the information provided by the originating client (in step 2b, above) to the destination client (as described in step 4, above), it has no effective value because it would contain internal network addresses that are not accessible from outside of the firewall/NAT.

The ability of a client that resides behind a firewall/NAT to interchange RTP directly with a client that resides on the other side of that firewall/NAT depends on the type of firewall/NAT involved. There are different types of NAT. The classification of the various types of NAT can be found in the RFC 3489— STUN standards specification, herein incorporated by reference.

If either client resides 'behind' a firewall/NAT, then one of two possible cases exist:
1. The firewall/NAT will not allow the client to exchange RTP media packets directly with a client on the other side of the firewall/NAT (this is a symmetric type of NAT—according to RFC3489), and therefore no direct exchange of RTP media packets can be possible (this is the uncommon case).
2. The firewall/NAT is not symmetrical, allowing the client to exchange RTP media packets directly with a client on the other side of the firewall/NAT, and therefore direct exchange of RTP media packets can be enabled (this is the more common case).

What is needed is a way to eliminate the requirement that the server handle any of the RTP media packets exchanged between two media-handling clients during a communications session wherein at least one of the participating clients resides 'behind' a firewall/NAT. By eliminating the requirement of the server to handle any of the RTP media data packets involved with a communication session between two clients, the processing demands of the server, and the overall network bandwidth requirements are dramatically reduced.

In order to accomplish this in a client-server network architecture, a solution must be able to discover whether a firewall/NAT exists between the server and a client, and, if so, whether the firewall/NAT is not symmetric (will allow direct exchange of RTP media packets between the client behind the firewall/NAT and another client that resides on the other side of the firewall/NAT). The solution also needs, when permissible by the firewall/NAT type, to enable the clients to perform the direct exchange of RTP media packets between themselves, without passing any of the RTP media packets through the managing server.

The solution needs to also address the possibility that, in some percentage of the cases, a client will reside behind a firewall that is symmetric (does not allow client residing behind the firewall/NAT to directly exchange RTP media packets with another client that resides on the other side of the firewall/NAT). In each such case, the communications server can fall back to the traditional communications session arrangement used in prior art (as described in the current art example above).

SUMMARY OF THE INVENTION

The novelty of the technology developed according to the present invention is that it allows, in the majority of cases in a client-server network architecture, a client that resides behind a firewall/NAT to exchange RTP media packets directly from another client that can be behind another firewall or on the public network, without requiring the managing server to handle any of the RTP media packets that are exchanged between the clients.

The solution provided in the present invention determines (and remembers) whether a specific involved client resides behind a firewall/NAT. If so, it is discovered (and remembered) whether the involved firewall/NAT will allow that client to directly exchange RTP media packets with another client through a 'pinhole' in the firewall/NAT. The key determination is whether the involved firewall/NAT is of the symmetric type. Note that this discovery is accomplished without the direct involvement of the client, and is accomplished from 'outside' the firewall/NAT. This is necessary because the client has no 'knowledge' about the firewall/NAT type. In fact, the client does not even 'know' that it resides behind a firewall.

If the firewall/NAT is not symmetric, the server enables the client to exchange RTP media packets directly with a client on the other side of that firewall/NAT (without requiring the server to handle any of the RTP media packets). If the firewall/NAT is symmetric, then the server manages the communications session as is traditionally done in the art (the server acts as a transfer point for all exchanged RTP media packets).

In order to accomplish these benefits, the present invention, upon determining that an originating client is located behind a firewall/NAT, 'instructs' the originating client to open a RTP media packet exchange session with the server. As the originating client requests this session, a pinhole for the media exchange session is opened in the originating client's local firewall. Upon receiving the first RTP media packet from the client, the server retrieves the network address and port number of the pinhole being used by the client. After this is accomplished, the server immediately opens a RTP media exchange communication session with the target destination client. Once a session is established with the target destination client, the server modifies the message 'header' information in the next data packet sent to each client.

The header information for the packet sent by the server to the originating client contains the destination client's network address and port number as the 'originating' address and port number of the sender. The originating client reads the header information, and assumes that the sender's address and port number are where to send RTP media exchange data packets, thus causing all future RTP media data packets sent by the originating client to be routed directly to the destination client (without passing through the server or its local network elements).

Similarly, the header information for the packet sent by the server to the destination client contains the originating client's network address and port number as the 'originating' address and port number of the sender. The destination client reads the header information, and assumes that the sender's address and port number are where to send RTP media exchange data packets, thus causing all future RTP media data packets sent by the destination client to be routed directly to the originating client (without passing through the server or its local network elements).

Thus, the server manages to establish a RTP media exchange session between two clients (at least one of which resides behind a firewall/NAT), without the server being required to act as the exchange point for all of the RTP media packets sent from one client to the other.

In the examples provided in this description of the present invention, the system is implemented using the commonly understood and widely used Internet protocol (TCP/IP), and the RTP application is VoIP using Session Initiation Protocol (SIP) and Session Description Protocol (SDP). This is done only for the sake of clarity and brevity, and is neither intended to limit the network protocols that will work with the present invention, nor to limit the application of the present invention to a single RTP media type. This present invention can find application wherever a client-server network has clients that need to exchange any type of content, such as faxes, pictures, movies, MRTP (media real-time protocol) and the like.

A person reasonably skilled in the art can see that protocols other than SIP/SDP can be used in the implementation of the present invention. Any protocol that supports communication session management via signaling messages that can be exchanged between a client and server application, and supports the ability to instruct the client to send content (i.e., media) messages to a different destination than that of the server application, would support implementation of the present invention.

Additionally, it would be obvious to such a person that RTP applications other than VoIP can take advantage of the benefits provided by the present invention. For instance, systems implementing streaming video applications (such as video and video-conference calls) that transfer very high volumes of RTP media packets containing video frames can be made more efficient by applying the processes of the present invention.

Benefits of this Novel Approach to RTP Session Handling

This approach lowers server-processing requirements on a per-session basis, ultimately resulting in less server processing power required to manage the same number of communication sessions. This reduces the processing power and network bandwidth requirements, and thus the cost, of a communications system.

There is the additional benefit of improved communications reliability due to the fact that fewer components are involved with the exchange of RTP media packets.

The present invention also provides the benefit that, even if the CMS were to fail after establishing a RTP media session between two clients, the clients could continue to exchange RTP media packets directly with one another. In the worst case, when the clients terminate their session, their attempts to notify the CMS could fail if the server has not yet recovered. The clients will still have completed their useful work without loss of connection with one another during the session. In a best-case recovery scenario, the CMS recovers before the session between the clients is terminated, and therefore receives and responds properly to the clients when they send their signaling packets that inform the CMS that they've ended their session.

In certain applications of this invention, such as in a voice-over-Internet protocol (VoIP) network, wherein digital 'phone calls' are established between Internet voice appliance clients, the quality of service for a call is improved. This is because timely delivery of those RTP media packets that contain the voice information is very important. Too much delay in the packet delivery process can cause some of the packets to be abandoned or 'lost' by Internet components, thereby distorting or 'chopping up' of the audio delivered to the receiving party (resulting in overall reduced audio quality during a call).

Without the CMS inserted into the RTP media packet communications path, there is potentially less delay involved with the delivery of each RTP media packet. This is because there is no time lost in processing of the RTP media packets by the CMS.

In addition, this approach eliminates two legs of the RTP media packets communications link (Endpoint 1-to-the Server, and the Server-to-Endpoint 2), replacing them with a single Endpoint 1-to-Endpoint 2 leg. In practice, the server is in one city (such as Los Angeles, Calif.) and the clients are located all over the world. So, instead of having a communications link with two unnecessary (and usually very long) legs, there is only one leg that is much shorter. This results in a potential overall reduction in propagation delay for the RTP media packets, since the packets can than be traversing fewer and shorter individual links in the communications path.

This also results in overall network bandwidth savings that, in the aggregate, are significant. In an embodiment of the invention, the CMS establishes communications in this manner between two clients, both in London, England. There is no requirement for RTP media packets to travel from London, England to Los Angeles, Calif., and then back to London, England. The local London, England network can handle all of the RTP media packet traffic, and bandwidth is preserved in the more expensive and bandwidth-limited international links of the network. From a commercial point of view, the client users benefit from the less expensive RTP media packet handling. This is because the service vendor does not have to purchase as much bandwidth on the more expensive international links, since all of the RTP communications are handled more locally. Additionally, the service vendor's costs are kept lower because the reduced processing requirements for the CMS allow the vendor to operate a less expensive server.

Comparison to the Prior Art

The current art has no cost-effective ubiquitous solution to this problem. There are other solutions current in the art that solve some of the issues related to handling RTP media packet exchange through a firewall/NAT. However, each of these solutions leaves unresolved issues that are successfully addressed in the present invention.

The 'Simple Traversal of UDP through NAT' (STUN) protocol allows applications to detect that a NAT is being used. It can also be used to detect the type of NAT and IP address assigned by it. STUN-based technology requires that a separate STUN server be located on the 'open' Internet. Also, very importantly, this approach requires that each participating RTP media-handling client located behind a firewall/NAT be STUN-compliant. Since a large percentage of currently deployed client devices are not STUN-compliant, these clients cannot participate in sessions that use the STUN approach.

The STUN solution, while workable, is costly, and limited in application due to business arrangement restrictions commonly in place between network providers and users. This technology only works with very limited types of firewalls. Most service providers, for these reasons, are abandoning this approach.

The present invention does not require the use of a STUN-protocol server residing on the 'open' Internet (not behind a firewall/NAT). The present invention also does not require STUN-compliant clients.

Other solutions are currently being proposed implementing a server that uses a process wherein:
1. The initial (originating) client establishes a communications session with the server and requests a communications session with a destination client.
2. The server establishes communications session with the target destination client.
3. The server begins handling the exchange of RTP media packets between the two clients.
4. After the two client sessions are established with the server, and the exchange of RTP media packets has commenced, the server then 'releases' the RTP to the local network data packet switch, thereby allowing the involved clients to exchange the remaining RTP media packets through the network data packet switch instead of through the server's own resources (VRU, network connections with the packet switch, server processor and storage, etc.).

In current art, commonly used communications protocols (such as the well-known Internet Protocol) permit clients to change the type of media packets being exchanged during a call (from voice to fax, for example). In step 3 above, (assuming a VoIP phone call scenario) the call is 'established' (the call setup process is finished for both clients). If an attempt is made by the clients to change the media type, and that attempt coincides in time with the server's attempt (in step 4) to 'release' the RTP media packet handling to the packet switch, the call could be dropped completely. Minimally, in this scenario, the ability of the server to release the RTP media packet handling to the packet switch is lost. This is not the case with the present invention.

Another disadvantage of this approach is that the server must first begin processing the exchanged RTP media packets before the RTP is released to another session. Additionally, this approach leaves the clients vulnerable to a server failure during the time that the server is handling the RTP media packets. If a server failure occurs during this time, RTP media packets could be lost, and most certainly would be delayed.

For example, in U.S. patent application 20040223490 (titled: "Method and system for releasing a voice response unit from a protocol session", Donavan, et. al.) a method is described that allows the exchange of RTP media packets through a firewall/NAT. However, in the solution proposed by Donavan, special configuration of the involved firewalls is required, and the managing server must initially handle all client-exchanged RTP media packets prior to 'releasing' the RTP exchange packet stream. In practice, the 'release' of the RTP media packets is simply a re-routing of the packets away from the server, but this leaves both legs of the communications link between the clients still attached to the server's local network, so the two initial legs of the communications link remain even after the RTP media packets are 'released.' Rather than discover the firewall/NAT type, the Donovan solution simply assumes that the involved firewalls must be configured a certain way in order for the process to work properly. Additionally, Donovan's solution has no fallback mode is selected if a firewall is incorrectly configured (as does the present invention).

In contrast, the present invention does not require special configuration of the involved firewall/NAT(s), and does not handle any of the RTP media packets exchanged between the clients. The clients' RTP media packets are not sent to the CMS in order to exchange media. A few media packets do arrive at the CMS while determining the address and port of the pinhole, but not for exchange of RTP media packets between clients. Additionally, when the present invention is implemented and a client-to-client RTP media packet exchange begins, the transmission path for the RTP media packets is reduced to a direct connection between the two clients, rather than requiring those packets to continue to follow the link to the CMS (or the CMS's local network router) and then out to the far end.

The present invention provides significant advantages over the prior art, resolving issues not addressed in previous solutions. The objects, advantages and operation of the present invention will be better understood from the following detailed description of a preferred embodiment of the invention with reference to the drawings. A brief description of each drawing figure is provided below.

DETAILED DESCRIPTION OF THE INVENTION

Figure 1:
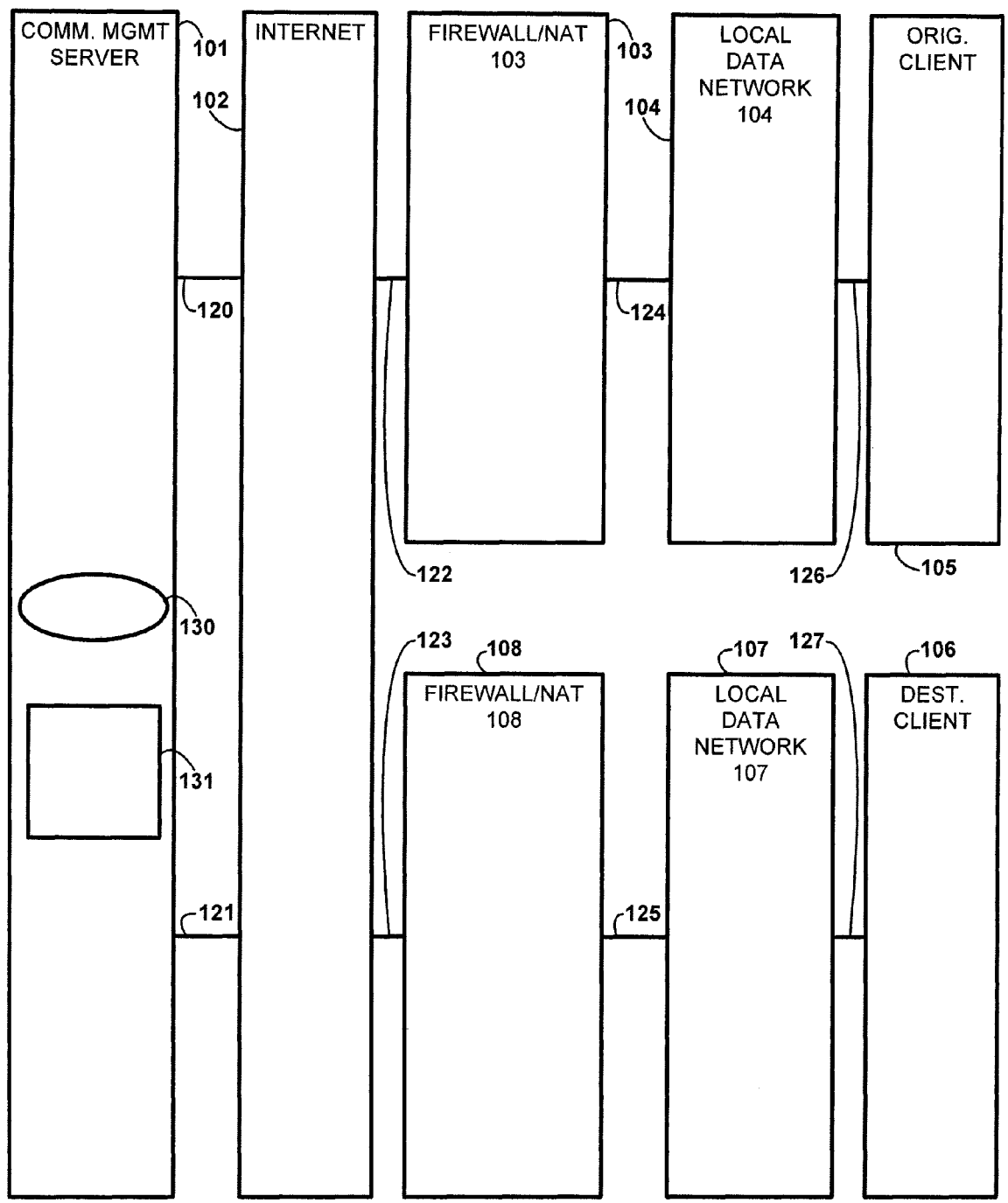
FIG. 1 is a simplified block diagram of the client-server network wherein the present invention is implemented according to an embodiment, showing the initial state of communications prior to the power-up of any client.

It is to be understood that the description of the present invention is not limited in its application to the details illustrated in the accompanying drawings and is capable of being practiced or carried out in various ways.

Client-to-Client Connection with Each Client Residing Behind a Different Firewall/NAT For the purpose of this discussion, a communications management server (CMS) exists on the Internet. In an embodiment of the present invention, it is assumed that each client resides 'behind' a firewall/NAT (there is a firewall between each client and the CMS). Note that this is the most complex scenario. It is possible that only one of the clients resides behind a firewall/NAT. In a common application, the destination client would be a public Internet IP-to-PSTN (Public Service Telephone Network) gateway that converts VoIP calls data (from the originating client) into audio signals compatible with the public telephone network. The gateway would not be located behind a firewall/NAT.

According to an embodiment of the invention, when any client initializes, it automatically attempts to establish a signaling communication path to a CMS's operating application. This causes a 'pinhole' to be created in the client's local firewall/NAT. This is a 'signaling pinhole' (with its own network address and port number) that, in general, can be used to send commands back to the client, but not for exchange of RTP media packet data streams. By discovering a discrepancy between the network address reported by the client (as it's own location) and the actual address from which the clients' messages arrive (the firewall/NAT pinhole address) the CMS can determine that a client located behind firewall/NAT. Depending on the parameters set in the firewall/NAT, there is then a predetermined amount of time during which the pinhole can be used to send packets to the client from a network address that resides 'outside' the firewall/NAT. The initiating client transmits a signaling message to the Communications Server that provides its private local network address and port number, along with other client information (identity, etc.).

Upon receiving a communication from an initializing client, the CMS retrieves the pinhole and client identity information. The CMS's operating application then instructs the initializing client to transmit 'refresh' packets through the pinhole at minimum intervals in order to maintain the existence of the pinhole. To each refresh packet, the CMS immediately responds, thereby keeping the pinhole active and open. Ideally, this signaling pinhole is maintained indefinitely to allow immediate communications between the client and the CMS's operating application. The CMS's application tracks, in real time, which clients have signaling pinholes established, and the information about each pinhole.

An originating client sends a signaling message (via its signaling pinhole in the local firewall/NAT) to the CMS's application, requesting a connection for a RTP session with a destination client. The CMS's application retrieves from the request message the destination client's identity, as well as the identity of the originating client.

The CMS's application determines the type of the originating client's firewall to determine whether the originating client is allowed to directly exchange RTP media packets with a client on the other side of the firewall/NAT. First, the CMS's application checks its own database to see if it already knows the answer. In an embodiment of the present invention, if this information is already stored, then the CMS's application uses it.

Otherwise, the CMS's application generates a series of test transmissions that are sent to the original client in order to determine whether the originating client is behind a firewall/NAT and, if so, whether the firewall/NAT is symmetric (not allowing the originating client to directly exchange RTP media packets with a client that resides on the other side of the firewall/NAT). If the answer is discovered within a pre-defined time, the CMS's application stores the answer for future use when handling this client (and any other client behind this firewall/NAT) as an originator or a destination.

If the originating client is behind a firewall/NAT that is symmetric (or if the answer was not discovered within the pre-defined time), the CMS's application does not attempt to enable direct exchange of RTP media packets directly between the clients. Instead, the CMS's application instructs the originating client to establish an RTP session with the CMS, handling the RTP media packets as is traditionally done in the art. In this less common case, the exchange of RTP media packets between the clients is accomplished through the CMS once both the originating and destination clients have established RTP sessions with the CMS, and the all of the rest of steps in this process are abandoned.

If the originating client is allowed to exchange media packets directly (the originating client is behind a firewall/NAT that is not symmetric), then the CMS's application checks the conditions of the destination client's firewall/NAT. In an embodiment of the present invention, first, the CMS's application checks its own database to see if it already knows the answer. If this information is already stored, then the CMS's application uses it.

otherwise, The CMS's application generates a series of test transmissions that are sent to the destination client in order to determine whether the destination client is behind a firewall/NAT and, if so, whether the firewall/NAT is symmetric (not allowing the destination client to directly exchange RTP media packets with a client that resides on the other side of the firewall/NAT). If the answer is discovered within a pre-defined time, the CMS's application stores the answer for future use when handling this client (and any other client behind this firewall) as an originator or a destination.

If the destination client is not allowed to exchange RTP media packets directly with a client on the other side of the firewall/NAT (the firewall/NAT is not symmetric), the CMS's application does not attempt to establish direct exchange of RTP media packets directly between the clients. Instead, the CMS's application instructs the destination client to establish an RTP session with the CMS, handling the RTP media packets as is traditionally done in the art. In this case, the exchange of RTP media packets between the clients is accomplished through the CMS once both the originating and destination clients have established RTP sessions with the CMS, and the all of the rest of steps in this process are abandoned.

If the destination client is allowed to exchange RTP media packets directly with a client on the other side of the firewall/NAT (the firewall/NAT is symmetric), then a signaling message is sent by the CMS's application to the originating client through the client's signaling pinhole. In an embodiment of the present invention, the message contains instructions to the originating client to establish a second 'RTP' pinhole through the originating client's local firewall/NAT.

The originating client's RTP pinhole network address and port number are made available to the CMS's application when the originating client sends its first packet to the CMS via the RTP pinhole. Note that if the originating client does not send an RTP packet to the CMS via the RTP pinhole, or if the CMS fails to extract the network address and port number of the RTP pinhole within a predetermined amount of time, the CMS assumes that direct exchange of RTP media packets with another client is impossible for the originating client. In this latter case, the CMS's application does not attempt to establish direct exchange of RTP media packets directly between the clients. Instead, the CMS's application instructs the originating client to establish an RTP session with the CMS, handling the RTP media packets as is traditionally done in the art. In this case, the exchange of RTP media packets between the clients is accomplished through the CMS once both the originating and destination clients have established RTP sessions with the CMS, and the all of the rest of steps in this process are abandoned.

The CMS substitutes the originating client's network address and port number with the originating client's RTP pinhole information, and then converts the request information from originating client to look like a communication request received from a client located on the public Internet (not behind a firewall/NAT). All local information in the originating client's request (which is not usable outside of the local firewall/NAT) is changed in the SIP and SPD portions of the request. After the request data is converted, all other possible entities involved in the process recognize this device as located on the public Internet. The result is that any other entity on the Internet will handle the request without requiring any special treatment.

After the originating client has been handled, a separate signaling message is sent by the CMS's application to the destination client through the client's signaling pinhole.

The message contains instructions to the destination client to establish a second 'RTP' pinhole through the destination client's local firewall/NAT. The destination client's RTP pinhole network address and port number are made available to the CMS's application when the destination client sends its first packet to the CMS via the RTP pinhole. Note that if the destination client does not send an RTP packet to the CMS via the RTP pinhole, or if the CMS fails to extract the network address and port number of the RTP pinhole within a predetermined amount of time, the CMS assumes that direct exchange of RTP media packets with another client is impossible for the destination client. In this latter case, the CMS's application does not attempt to establish direct exchange of RTP media packets directly between the clients. Instead, the CMS's application instructs the destination client to establish an RTP session with the CMS, handling the RTP media packets as is traditionally done in the art. In this case, the exchange of RTP media packets between the clients is accomplished through the CMS once both the originating and destination clients have established RTP sessions with the CMS, and the all of the rest of steps in this process are abandoned.

The CMS substitutes the destination client's network address and port number with the destination client's RTP pinhole information, and then converts the request information from destination client to look like a communication request received from a client located on the public Internet (not behind a firewall/NAT). All local information in the destination client's request (which is not usable outside of the local firewall/NAT) is changed in the SIP and SPD portions of the request. After the request data is converted, all other possible entities involved in the process recognize this device as located on the public Internet. The result is that any other entity on the Internet will handle the request without requiring any special treatment.

Once both the originating and destination clients have completed establishing their local RTP pinholes, and the CMS's application has discovered the network address and port number of their associated RTP pinhole, the CMS's application sends the originating client a signaling message through the originating client's signaling pinhole that instructs the originating client to send all RTP media packets to the network address and port number of the RTP pinhole established by the destination client. Placing the network address and port number(s) of the destination client's RTP pinhole(s) into the appropriate field inside the SDP portion of the signaling message accomplishes this. The signaling message also instructs the originating client to send all RTP media packets through the local RTP pinhole(s) established by the originating client to the destination client's local RTP pinhole address and port number and send all signaling messages to the CMS's application. Placing the application's contact information into the appropriate field of the signaling message accomplishes this.

The CMS's application sends the destination client a signaling message through the destination client's signaling pinhole(s) that instructs the destination client to send all RTP media packets to the network address and port number(s) of the RTP pinhole(s) established by the originating client. Placing the network address and port number(s) of the originating client's RTP pinhole(s) into the appropriate field inside the SDP portion of the signaling message accomplishes this. The signaling message also instructs the destination client to send all RTP media packets through the local RTP pinhole(s) established by the destination client to the local RTP pinhole established by the originating client's local RTP pinhole address and port number and send all signaling messages to the CMS's application. Placing the application's contact information into the appropriate field of the signaling message accomplishes this.

At this point, the clients begin exchanging the media (RTP) packets directly with one another through their respective RTP pinholes. This continues until one client or the other terminates the session.

When one of the clients terminates the session, it sends a signaling message back to the Communication Management Server's application indicating that the session is ended. After a pre-determined period of inactivity, the client's local RTP media packet exchange pinhole automatically expires, and is closed by the firewall/NAT. The Communication Management Server's application stores and uses the session termination information to keep track of when the session ended, and (combined with the initial session setup time) the duration of the session. This can be used for billing and statistical analysis purposes.

Public Network Client Connection with a Client Residing Behind a Firewall/NAT

In an embodiment of the present invention, when a client in the public network (that does not reside behind a firewall/NAT) attempts to establish a session with a 'private' client (that is behind a firewall/NAT) through the CMS, the CMS uses the existing signaling pinhole in the 'private' client's local firewall/NAT to communicate with the client that is behind the firewall/NAT.

Since the public network client is not residing behind a firewall/NAT, the CMS establishes communications with the public network client directly, and only on demand. There is no need to keep a 'signaling' channel open between that client and the CMS.

This process differs from above (where both clients resided behind a firewall/NAT), in that the public network side of the communication setup does not have a firewall/NAT in the path, and therefore no requirement exists to determine the firewall/NAT type, to establish a signaling pinhole, nor to establish a pinhole for use in RTP media packet handling.

As described earlier, the CMS substitutes the 'private' client's network address and port number with the 'private' client's RTP pinhole information, and then converts the request information from the 'private' client to look like a communication request received from a client located on the public Internet (not behind a firewall/NAT). All local information in the 'private' client's request (which is not usable outside of the local firewall/NAT) is changed in the SIP and SPD portions of the request.

The network address and port of the pinhole in the firewall/NAT that is used for RTP media packet handling is converted to 'public' protocol, and then passed to the public network client so that the public network client can pass RTP media packets directly to the client that resides behind the firewall/NAT.

After the 'private' client information has been passed to the public client, the public network client's network address and port are passed to the 'private' client that resides behind the firewall/NAT.

At this point the public and 'private' clients are able to directly exchange RTP media packets.

This process can be visualized by referring to FIG. 1 through FIG. 8 as explained in detail by the following description.

DETAILED DESCRIPTION OF THE DRAWINGS

Referring first to FIG. 1, a simplified block diagram is shown of the client-server network wherein the present invention is implemented. In this drawing, the initial state of communications prior to the power-up of any client is shown. Communications management server (CMS) 101 is powered up and is running operating application 130, which is in communication with Internet 102 via connections 120 and 121.

In FIG. 1, the remaining connections between the network elements are also shown. Firewall/NAT 103 communicates with Internet 102 via connection 122. Local data network 104 communicates with firewall/NAT 103 via connection 124. Originating client 105 communicates with local data network 104 via connection 126. Firewall/NAT 108 communicates with Internet 102 via connection 123. Local data network 107 communicates with firewall/NAT 108 via connection 125. Destination client 106 communicates with local data network 104 via connection 127.

Network elements originating client 105, along with destination client 106 and operating application 130 each have their own unique network address.

Operating application 130 of CMS 101 converts all received data communications packets to the format specified for use in public Internet 102 (the packets do not appear as though they were transmitted from behind a firewall/NAT).

Operating application 130 of CMS 101 stores data into, and retrieves data from, local storage means 131.

Still referring to FIG. 1, when originating client 105 is powered up, it first establishes communications with local data network 104 via connection 126, and then transmits a communication session request to local data network 104. This communications session request specifies the target address for the session as the unique network address of operating application 130 of CMS 101.

Referring still to FIG. 1, when destination client 106 is powered up, it first establishes communications with local data network 107 via connection 127, and then transmits a communication session request to local data network 107. This communications session request specifies the target address for the session as the unique network address of operating application 130 of CMS 101.

Figure 2:
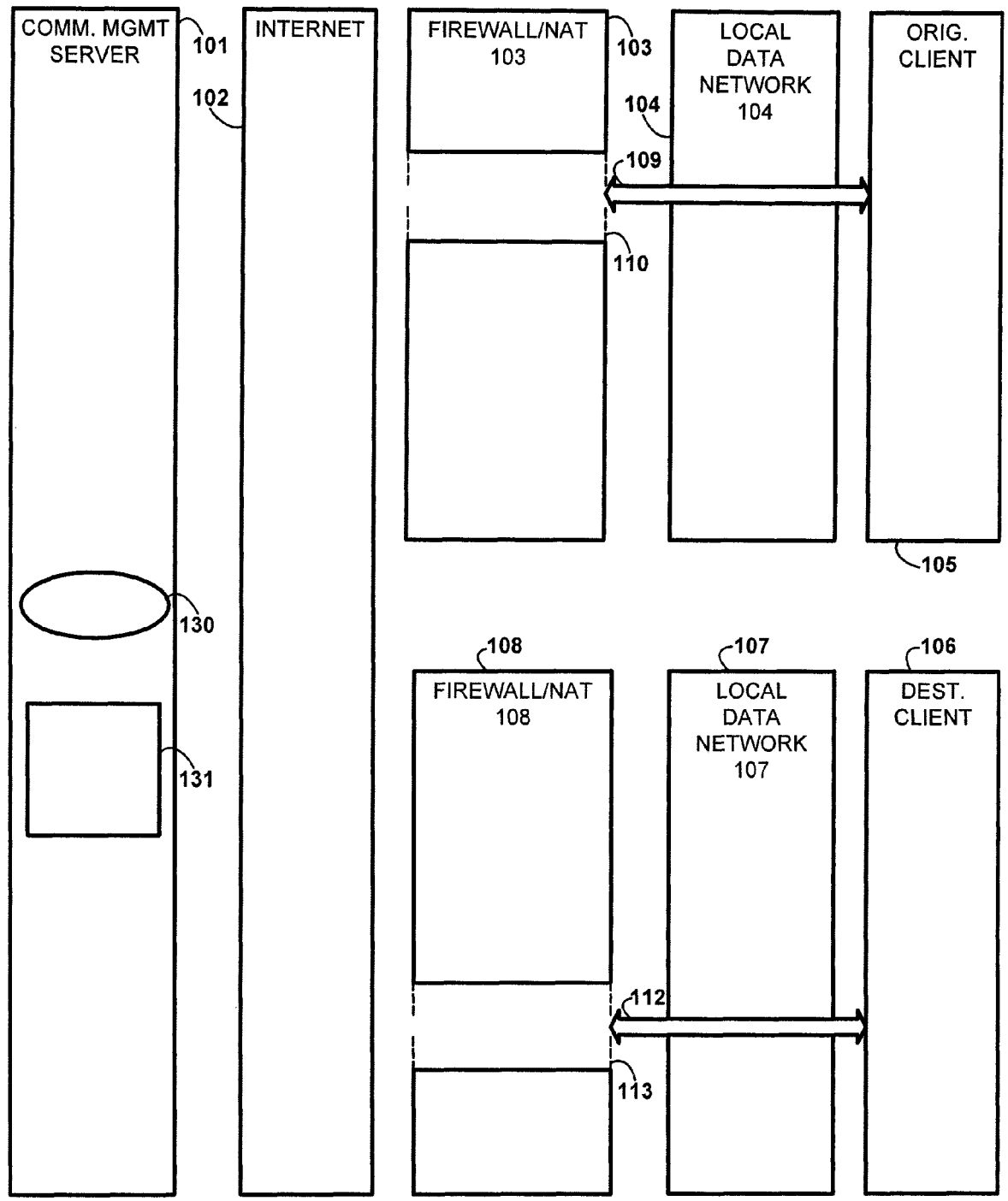
FIG. 2 is a simplified block diagram of the client-server network wherein the present invention is implemented according to an embodiment showing the system state of communications as both the originating and destination client power-up and each begins attempting to communicate with the communications management server by establishing a first pinhole through its respective firewall/NAT.

Now referring to FIG. 2, it can be seen that local data network 104 handles the communications session request from originating client 105 by attempting to establish a connection between originating client 105 and operating application 130 of CMS 101, but when the request is passed forward, it is intercepted by firewall/NAT 103. At this point in time, only communications path 109 is available to originating client 105 for interactive communications. The remainder of the communications path to CMS 101 is initially blocked by firewall/NAT 103.

It can also be seen in FIG. 2 that local data network 107 handles the communications session request from destination client 106 by attempting to establish a connection between destination client 106 and operating application 130 of CMS 101, but when the request is passed forward, it is intercepted by firewall/NAT 108. At this point in time, only communications path 112 is available to destination client 106 for interactive communications. The remainder of the communications path to CMS 101 is initially blocked by firewall/NAT 108.

Still referring to FIG. 2, as firewall/NAT 103 intercepts the communications session request of originating client 105, firewall/NAT 103 first establishes that the target network address of the request is allowed, and upon determining this to be true, opens up pinhole 110 through which originating client 105 can communicate with network elements that reside on the other side of firewall/NAT 103. Similarly, as firewall/NAT 108 intercepts the communications session request of destination client 106, firewall/NAT 108 first establishes that the target network address of the request is allowed, and upon determining this to be true, opens up pinhole 113 through which destination client 106 can communicate with network elements that reside on the other side of firewall/NAT 108.

Figure 3:
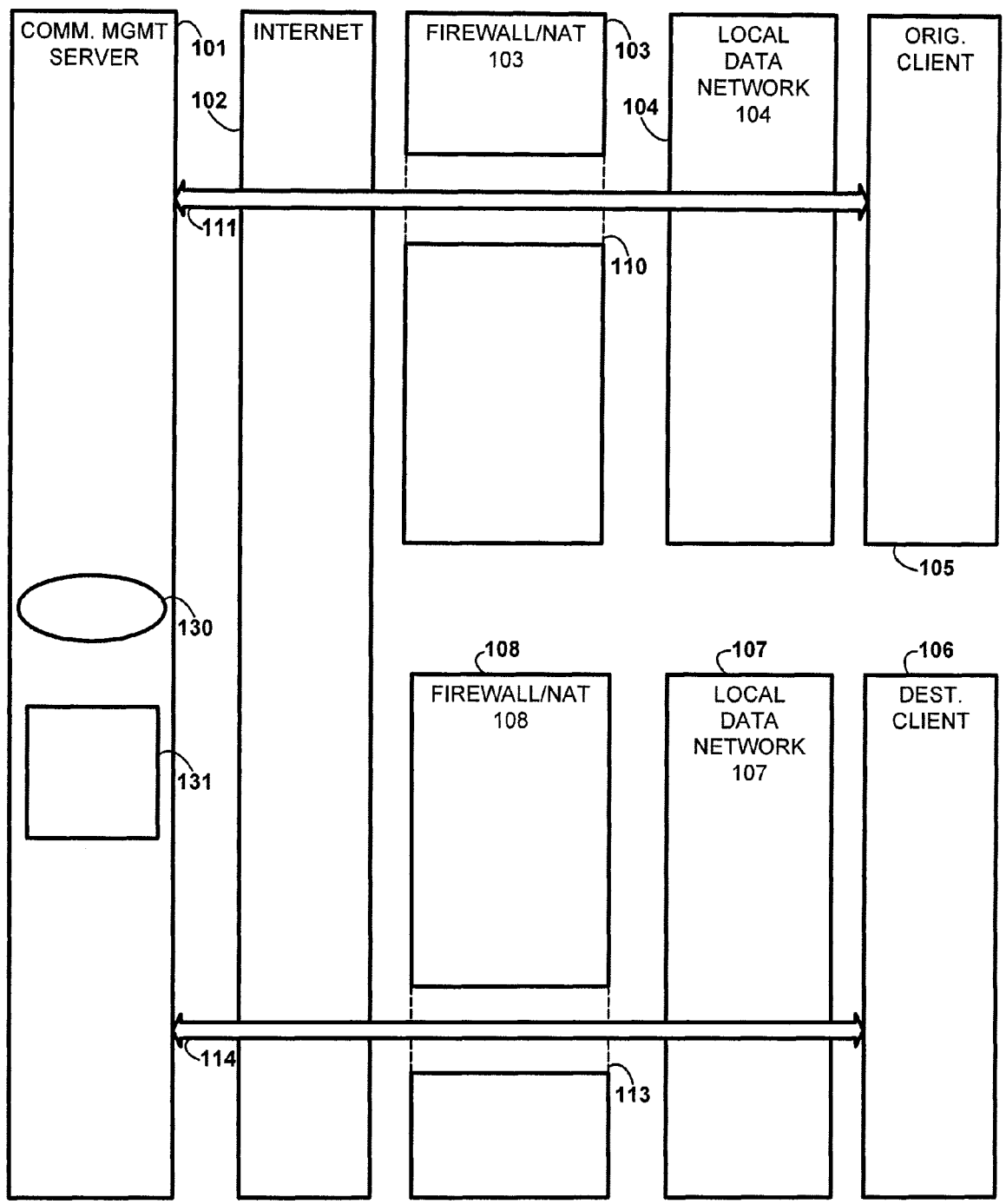
FIG. 3 is a simplified block diagram of the client-server network wherein the present invention is implemented according to an embodiment showing the system state of communications after both the originating and destination client have each established communications with the communications management server through the first (signaling) pinhole created in their respective firewall/NAT, and each has begun sending regular refresh communications packets through its respective firewall/NAT.

Now referring for FIG. 3, it can be seen that, after opening up pinhole 110, firewall/NAT 103 forwards to Internet 102 the communications session request from originating client 105 through Internet 102, thus enabling originating client 105 to establish a communications session with operating application 130 of CMS 101 via signaling communications path 111.

As is typical, firewall/NAT 103, upon opening pinhole 110, maintains a refresh rule that if no communications packets are transmitted by originating client 105 through pinhole 110 within a specified period of time, pinhole 110 is automatically closed, and communications through pinhole 110 are no longer possible. However, as long as at least one communications packet is transmitted by originating client 105 through pinhole 110 within the time period specified by the refresh rule, pinhole 110 remains open. Each time a new communications packet is received from originating client 105, the refresh rule time is reset, and firewall/NAT 103 begins once again to count down the specified period of time, requiring that another communications packet arrive from originating client 105 within that specified period of time. This cycle continues indefinitely as long as originating client 105 continues to send at least one communications packet through pinhole 110 within the specified period of time.

Operating application 130 of CMS 101, immediately upon establishing the requested communication session with originating client 105, transmits a message to originating client 105, commanding originating client 105 to begin regularly sending a refresh communications packet through pinhole 110 at a time interval that is smaller that that specified in the refresh rule of firewall/NAT 103. In this manner, the established communications session between originating client 105 and operating application 130 of CMS 101 remains active indefinitely as a signaling channel through which originating client 105 can transmit further connection requests directly to operating application 130 of CMS 101. Additionally, as long as this signaling channel remains open, operating application 130 of CMS 101 can transmit instruction packets to originating client 105 without having to re-establish a communications session with originating client 105.

In FIG. 3 it can also be seen that, after opening up pinhole 113, firewall/NAT 108 forwards to Internet 102 the communications session request from destination client 106 through Internet 102, thus enabling destination client 106 to establish a communications session with operating application 130 of CMS 101 via communications path 114.

Firewall/NAT 108, upon opening pinhole 113, maintains a refresh rule that if no communications packets are transmitted by destination client 106 through pinhole 113 within a specified period of time, pinhole 113 is automatically closed, and communications through pinhole 113 are no longer possible. However, as long as at least one communications packet is transmitted by destination client 106 through pinhole 113 within the time period specified by the refresh rule, pinhole 113 remains open. Each time a new communications packet is received from destination client 106, the refresh rule time is reset, and firewall/NAT 108 begins once again to count down the specified period of time, requiring that another communications packet arrive from destination client 106 within that specified period of time. This cycle continues indefinitely as long as destination client 106 continues to send at least one communications packet through pinhole 113 within the specified period of time.

Operating application 130 of CMS 101, immediately upon establishing the requested communication session with destination client 106, transmits a message to destination client 106, commanding destination client 106 to begin regularly sending a refresh communications packet through pinhole 113 at a time interval that is smaller that that specified in the refresh rule of firewall/NAT 108. In this manner, the established communications session between destination client 106 and operating application 130 of CMS 101 remains active indefinitely as a signaling channel through which destination client 106 can transmit further connection requests directly to operating application 130 of CMS 101. Additionally, as long as this signaling channel remains open, operating application 130 of CMS 101 can transmit instruction packets to destination client 106 without having to re-establish a communications session with destination client 106.

In the final state shown in FIG. 3, operating application 130 of CMS 101 maintains perpetual signaling communication with both originating client 105 and destination client 106.

Figure 4:
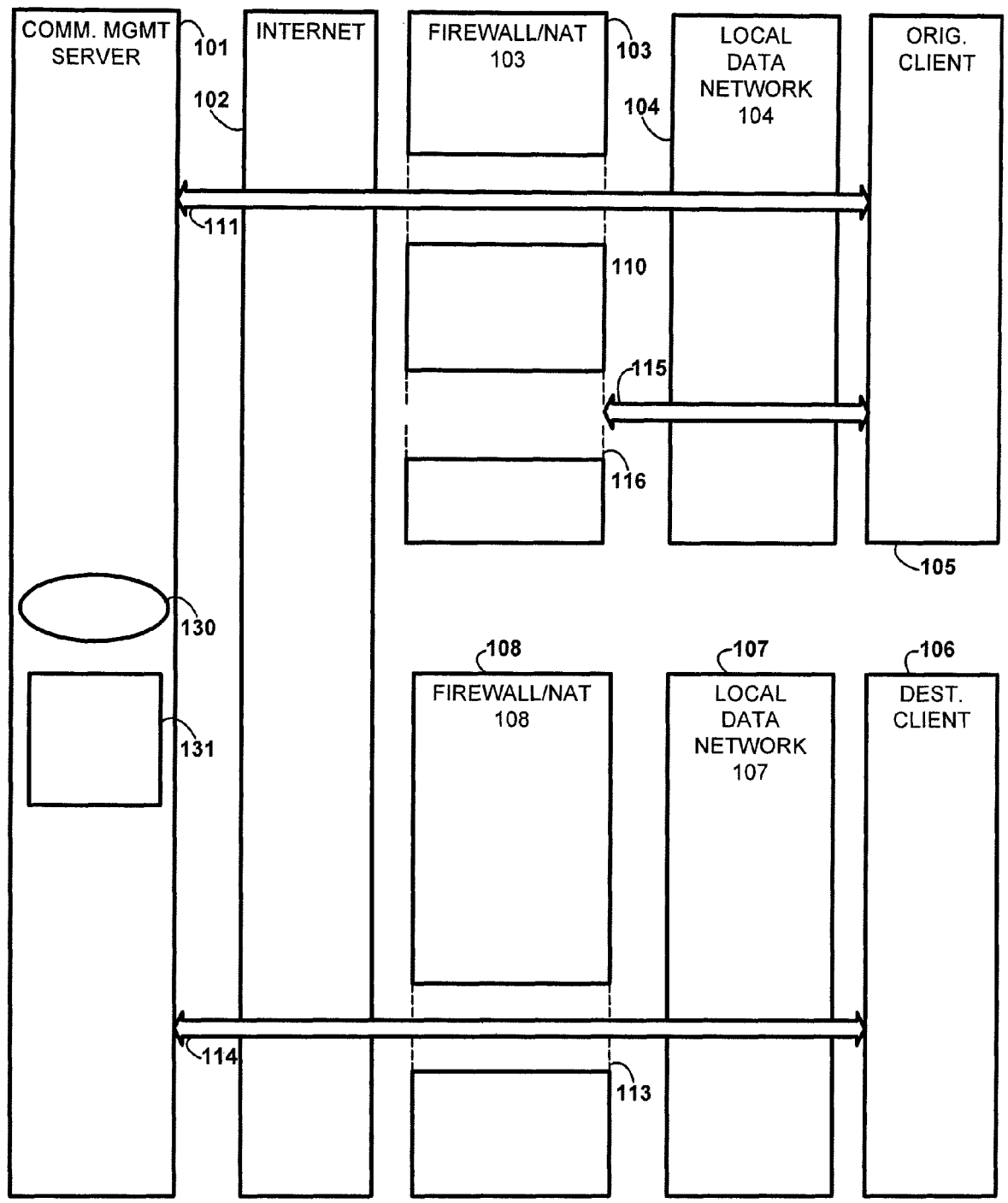
FIG. 4 is a simplified block diagram of the client-server network wherein the present invention is implemented according to an embodiment showing the system state of communications after the originating client has communicated with the communications management server through the first (signaling) pinhole in its local firewall/NAT to request a connection with the destination client, and the originating client has been instructed to open a second communications session with the CMS (thus opening a second (data exchange) pinhole in its local firewall/NAT.

Now referring to FIG. 4, it can be seen that, as originating client 105 transmits a communications session request to operating application 130 of CMS 101 via signaling communications path 111, with the unique network address of destination client 106 as the target destination entity, operating application 130 of CMS 101 transmits a return communications packet to originating client 105 via signaling communications path 111. The return communications packet sent by operating application 130 of CMS 101 contains an instruction that causes originating client 105 to request a second communications session with to operating application 130 of CMS 101. When originating client 105 transmits this request to local data network 104, local data network 104 attempts to open a second connection with operating application 130 of CMS 101. When this request is passed forward by local data network 104, it is intercepted by firewall/NAT 103.

Figure 5:
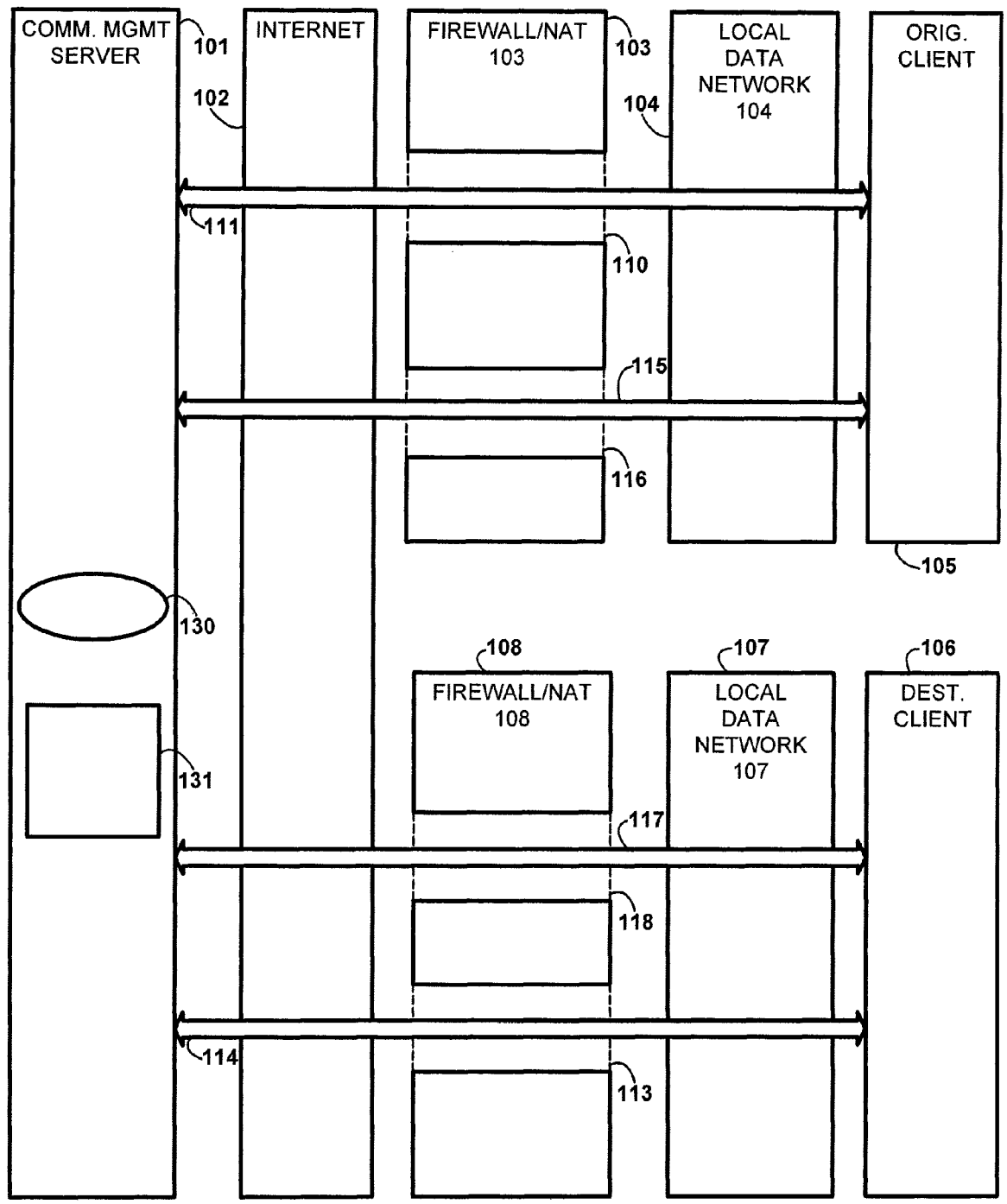
FIG. 5 is a simplified block diagram of the client-server network wherein the present invention is implemented according to an embodiment showing the system state of communications after the destination client has been instructed to open a second communications session with the CMS (thus opening a second (data exchange) pinhole in its local firewall/NAT.

Now referring to FIG. 5, it can be seen that after firewall/NAT 103 first determines that the target network address (found in the request by originating client 105 to establish a second communications session with operating application 130 of CMS 101) is allowed, firewall/NAT 103 opens up second (data exchange) pinhole 116 through which originating client 105 can communicate with network elements that reside on the other side of firewall/NAT 103. After opening up pinhole 116, firewall/NAT 103 forwards the second communications session request from originating client 105 through Internet 102, thus enabling originating client 105 to establish a second communications session with operating application 130 of CMS 101 via data exchange communications path 115.

Once operating application 130 of CMS 101 establishes the second session with originating client 105, it extracts the unique data network address and port number of pinhole 116 from the header information of the packets received through pinhole 116. This information is essential, since this is the address to which destination client 106 will send data exchange packets in order to cause those packets to reach originating client 105. This information is also useful for determining whether originating client 105 is located 'behind' a firewall/NAT. Operating application 130 of CMS 101 compares the network address and port retrieved from the header information contained in the data packets arriving through pinhole 110 with the network address and port number reported by originating client 105 as its own. If there is a difference between the compared information, then operating application 130 of CMS 101 determines that originating client 105 resides 'behind' a firewall/NAT.

Once it is determined that originating client 105 resides behind firewall/NAT 103, then operating application 130 of CMS 101 determines whether firewall/NAT 103 allows direct exchange of media data packets between clients on opposite sides of firewall/NAT 103.

This can be accomplished by examining information stored in local storage means 131, wherein the information about known clients and whether they reside behind a firewall/NAT, and, if so, whether or not that firewall/NAT allows direct exchange of media data packets between clients on opposite sides of that firewall/NAT. Alternately, a series of tests can be performed through the network against firewall/NAT 103. The results of those tests can be used to determine the packet exchange restrictions applied by firewall/NAT 103. The result of such a determination is immediately stored in local storage means 131. This eliminates the need to retest firewall/NAT 103 in the future, thus reducing processing power and the time required to handle future transactions involving originating client 105.

Upon retrieving the unique data network address and port number of pinhole 116, operating application 130 of CMS 101, via signaling communications path 114, instructs destination client 106 to establish a second (data exchange) communications session with operating application 130 of CMS 101. Upon receiving this instruction, destination client 106 transmits a request to local data network 107 to establish a second session with operating application 130 of CMS 101.

When this request is passed forward by local data network 107, it is intercepted by firewall/NAT 108.

Still referring to FIG. 5, it can be seen that after firewall/NAT 108 first determines that the target network address (found in the request by destination client 106 to establish a second communications session with operating application 130 of CMS 101) is allowed, firewall/NAT 108 opens up second (data exchange) pinhole 118 through which destination client 106 can communicate with network elements that reside on the other side of firewall/NAT 108. After opening up pinhole 118, firewall/NAT 108 forwards the second communications session request from destination client 106 through Internet 102, thus enabling destination client 106 to establish a second communications session with operating application 130 of CMS 101 via signaling communications path 117.

Once operating application 130 of CMS 101 establishes the second session with destination client 106, it extracts the unique data network address and port number of pinhole 117 from the header information of the packets received through pinhole 117. This information is essential, since this is the address to which originating client 106 will send data exchange packets in order to cause those packets to reach destination client 106. This information is also useful for determining whether destination client 106 is located 'behind' a firewall/NAT. Operating application 130 of CMS 101 compares the network address and port retrieved from the header information contained in the data packets arriving through pinhole 117 with the network address and port number reported by destination client 106 as its own. If there is a difference between the compared information, then operating application 130 of CMS 101 determines that destination client 106 resides 'behind' a firewall/NAT.

Once it is determined that destination client 106 resides behind firewall/NAT 108, then operating application 130 of CMS 101 determines whether firewall/NAT 108 allows direct exchange of media data packets between clients on opposite sides of firewall/NAT 108.

This can be accomplished by examining information stored in local storage means 131, wherein the information about known clients and whether they reside behind a firewall/NAT, and, if so, whether or not that firewall/NAT allows direct exchange of media data packets between clients on opposite sides of that firewall/NAT. Alternately, a series of tests can be performed through the network against firewall/NAT 108. The results of those tests can be used to determine the packet exchange restrictions applied by firewall/NAT 108. The result of such a determination is immediately stored in local storage means 131. This eliminates the need to retest firewall/NAT 108 in the future, thus reducing processing power and the time required to handle future transactions involving destination client 106.

Upon retrieving the unique data network address and port number of pinhole 117, operating application 130 of CMS 101 substitutes the address and port number in the next data exchange packet sent to originating client 105 via data exchange communications path 115. The substitute network address and port number placed into the data exchange packet sent to originating client 105 is the unique network address and port number of pinhole 118. Upon receiving the data exchange packet with the substituted network address and port number, originating client 105 begins addressing all further transmitted data exchange packets to the substitute address and port number (i.e., directly to pinhole 118, and thereby destination client 106).

Once this is accomplished, operating application 130 of CMS 101 substitutes the address and port number in the next data exchange packet sent to destination client 106 via data exchange communications path 117. The substitute network address and port number placed into the data exchange packet sent to destination client 106 is the unique network address and port number of pinhole 116. Upon receiving the data exchange packet with the substituted network address and port number, destination client 106 begins addressing all further transmitted data exchange packets to the substitute address and port number (i.e., directly to pinhole 116, and thereby originating client 105).

Figure 6:
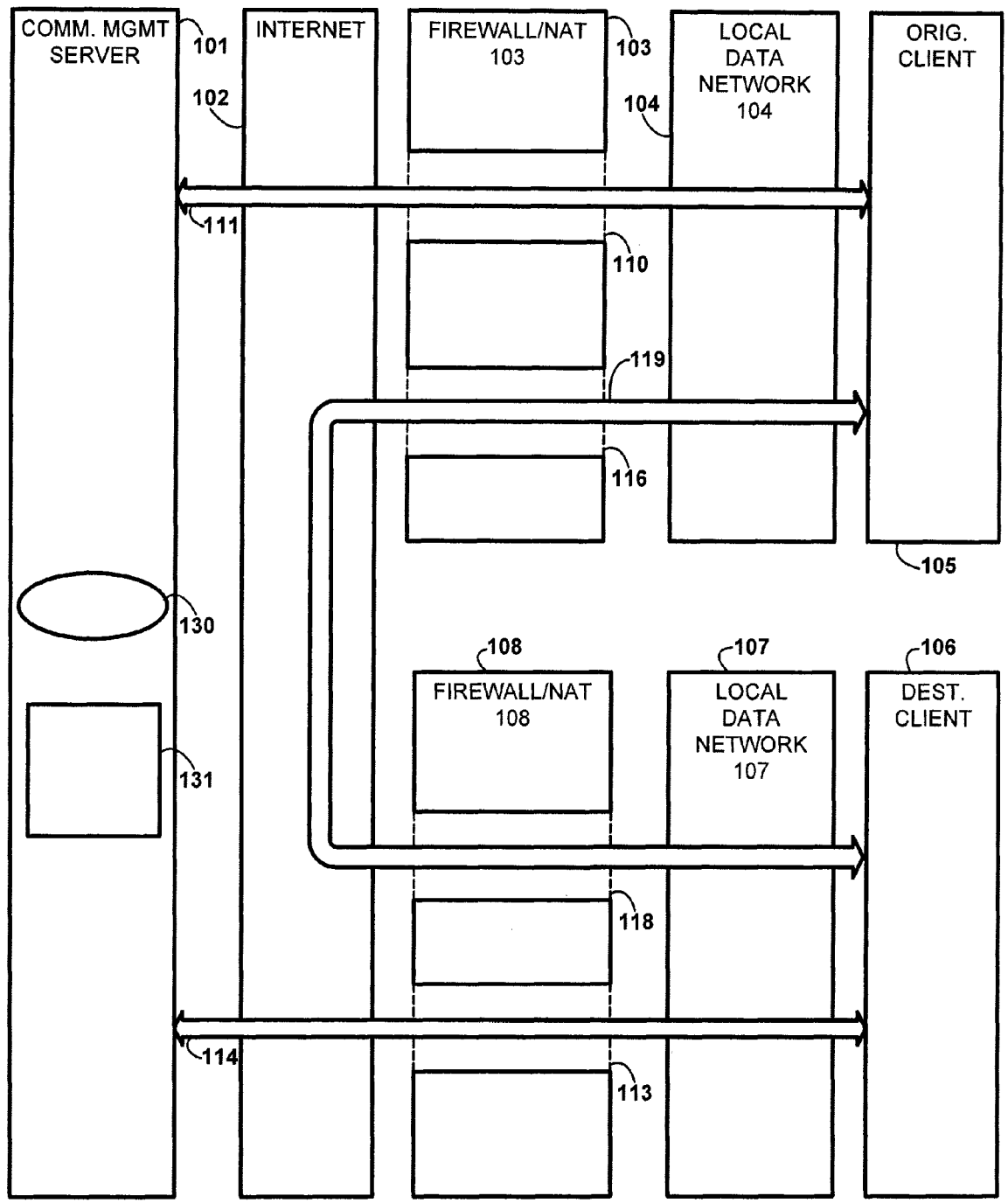
FIG. 6 is a simplified block diagram of the client-server network wherein the present invention is implemented according to an embodiment showing the communications paths used by the invention after the communications management server has instructed both the originating and destination client to begin exchanging RTP media packets by having each send its packets to the other's second pinhole.

At this point, originating client 105 and destination client 106 are exchanging data packets directly with one another (without those packets being passed through CMS 101). This can be seen in FIG. 6, where data exchange communications path 119 is the path through which data packets are exchanged between originating client 105 and destination client 106. Also seen in FIG. 6 is the fact that during the time that the data exchange (second) sessions are established, and during the remainder of the data exchange session between the two clients, each of the clients continues to send refresh communications packets, as necessary, in order to maintain its respective signaling path to CMS 101.

Even though refresh communications packets continue to be sent to operating application 130 of CMS 101 by both clients through their respective signaling communications paths, these refresh communications packets represent only a fraction of the volume of data exchange packets passing through data exchange communications path 119. Thus, CMS 101 is not required to process the much higher volume of data communications packets exchanged between originating client 105 and destination client 106.

When both the originating and destination client have terminated the communications session with one another, each communicates with operating application 130 of CMS 101 through its first (signaling) pinhole in its respective firewall/NAT to inform operating application 130 of CMS 101. In this signaling communications packet, each client informs operating application 130 of CMS 101 that it has terminated the packet exchange session with the other client. Once this is accomplished, each client continues to maintain its respective signaling pinhole by sending regular refresh communications packets through that pinhole to operating application 130 of CMS 101. This leaves the system in the state shown in FIG. 3, with each client ready to originate or accept a request for another communications session.

In the description above, generic terms have been used for simplifying the explanation of the processes used to establish a RTP media packet exchange between originating client 105 and destination client 106. In a specific example of a practical application of the present invention, originating client 105 and destination client 106 are both VoIP phones. In this example, the communications data packets exchanged between the clients via data exchange communications path 119 contain the digital representation of the voice signals exchanged between the VoIP phone users.

While the description above describes the processes whereby two clients (both of which reside 'behind' a firewall/NAT) are enabled to exchange RTP media data packets directly with one another, the scenario also exists in which only one of the clients resides behind a firewall/NAT, but the other client does not reside behind a firewall/NAT. In fact, in some cases, the second client is directly connected to Internet 102, without utilizing a local data network. This data element organization can be seen in FIG. 7.

Figure 7:
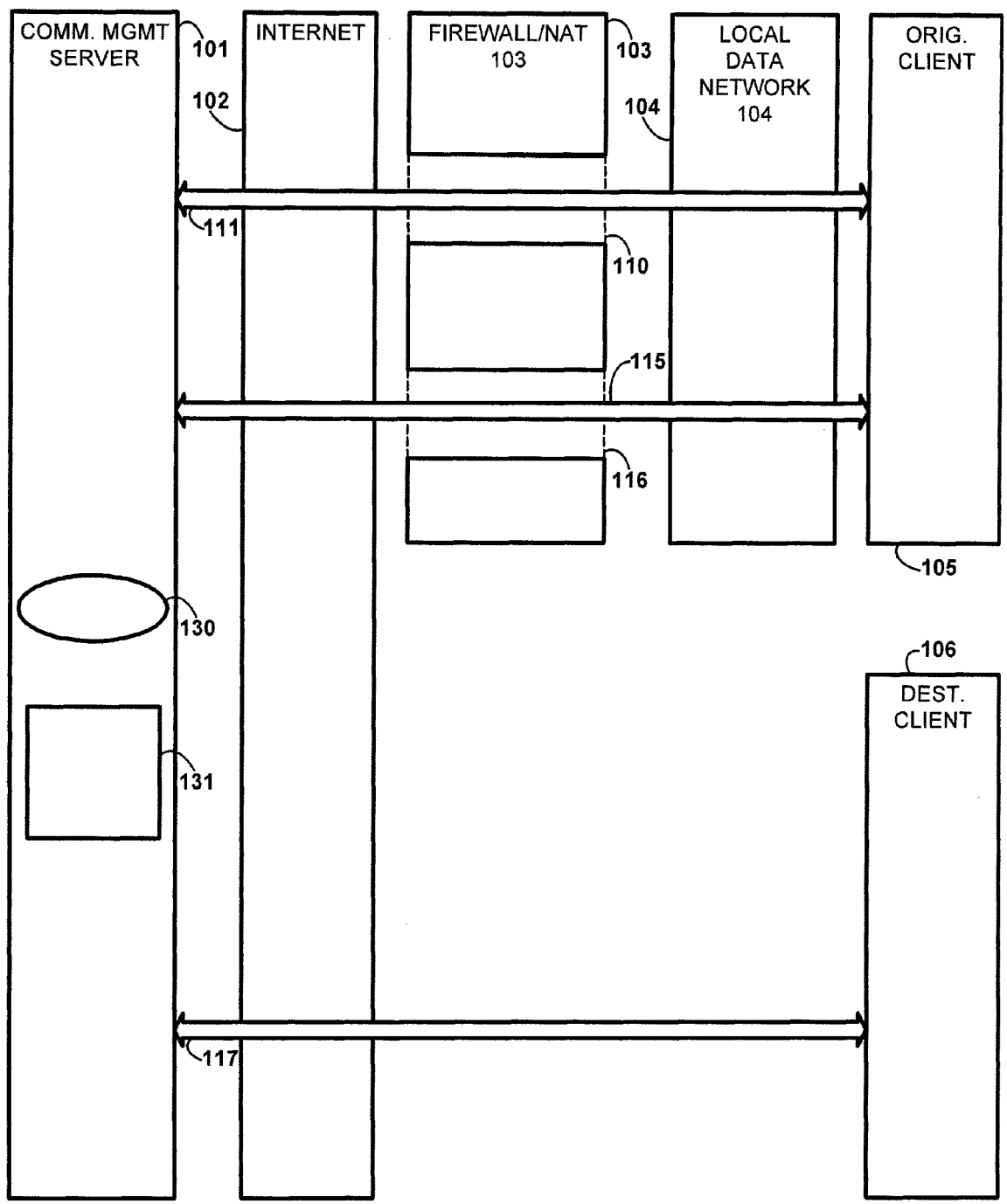
FIG. 7 is a simplified block diagram of the client-server network wherein the present invention is implemented according to an embodiment showing the network elements and connections involved when the destination client is not residing behind a firewall/NAT.

Now referring to FIG. 7, it can be seen originating client 105 resides behind firewall/NAT 103 and utilizes local data network 104 as a component of its connection to Internet 102, but destination client 106 is connected directly to Internet 102, and does not reside behind a firewall/NAT.

All of the processes described above relating to establishing signaling communications path 111 and data exchange communications path 115 between operating application 130 of CMS 101 and originating client 105 remain the same in this scenario. However, the steps relating to establishing a signaling connection between operating application 130 of CMS 101 and destination client 106 are no longer required. This is because operating application 130 of CMS 101 can, at any time, immediately establish a data exchange communications session with destination client 106.

Still referring to FIG. 7, upon powering up, destination client 106 does not establish a communications session, via to Internet 102, with operating application 130 of CMS 101. Instead, destination client 106 simply awaits a connection from operating application 130 of CMS 101.

In this scenario, when originating client 105 transmits, via signaling communications path 111, a data message to operating application 130 of CMS 101 requesting a data exchange communications session with destination client 106, the same process described above occurs involving establishing second (data exchange) pinhole 110. This results, as described earlier, in the unique network address and port number of second (data exchange) pinhole 116 being discovered by operating application 130 of CMS 101.

In this scenario, after second (data exchange) pinhole 116 is established and the unique network address and port number of pinhole 116 known, operating application 130 of CMS 101 establishes a data exchange communications session, via Internet 102, with destination client 106. Once this session is established, operating application 130 of CMS 101 substitutes for its own, the unique network address and port number of second (data exchange) pinhole 116 in data packets transmitted from operating application 130 of CMS 101 to destination client 106, via communications path 117. When destination client 106 receives the data packets containing as their originating address the unique network address and port number of pinhole 116, destination client 106 begins transmitting all further data exchange packets to the unique network address and port number of pinhole 116, and thereby originating client 105.

Additionally, when it is determined by operating application 130 of CMS 101 that destination client 106 does not reside behind a firewall/NAT, operating application 130 of CMS 101 substitutes the its own network address and port number with that of destination client 106 in the next data packet transmitted to originating client 105 (via data exchange communications path 115).

Figure 8:
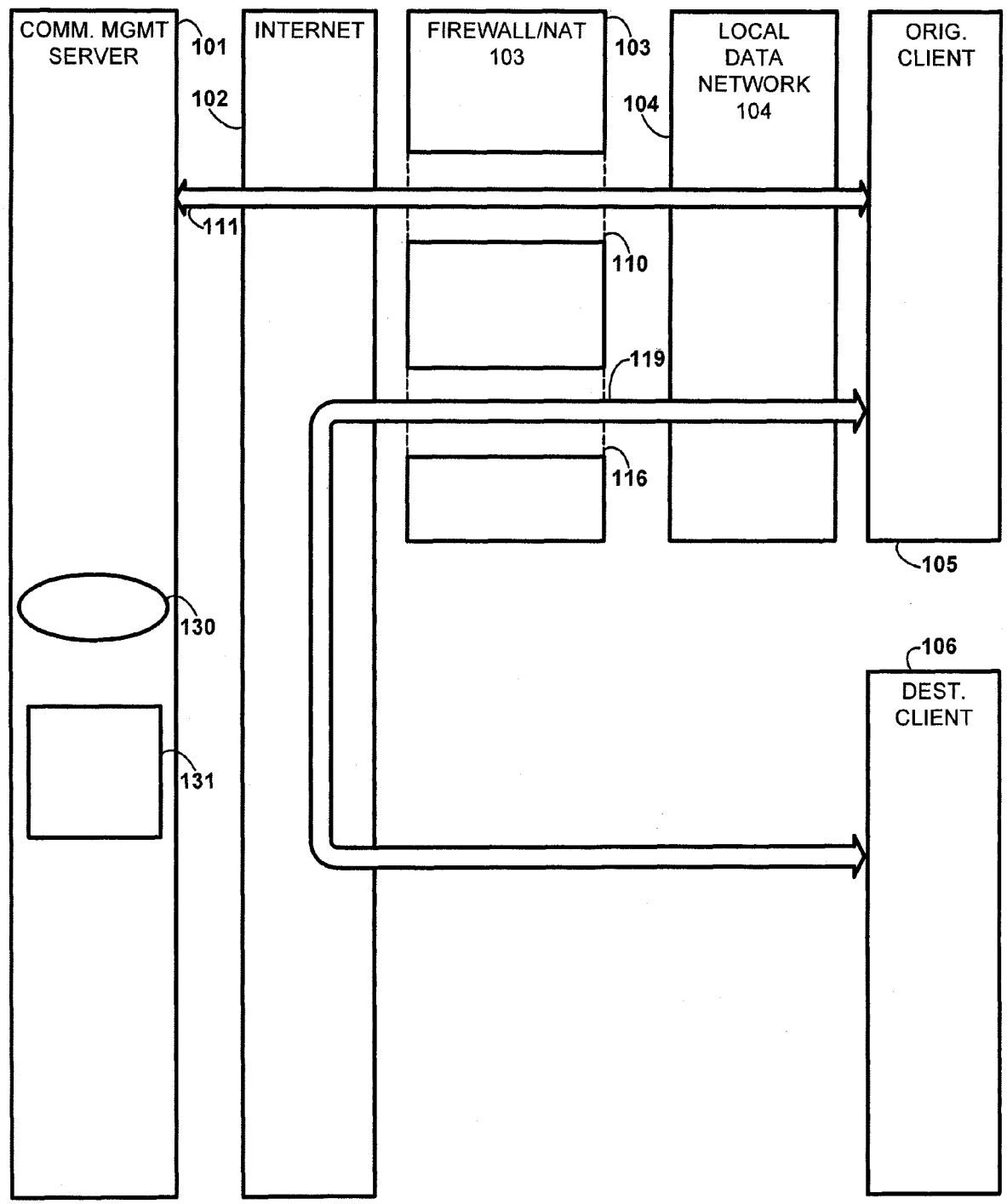
FIG. 8 is a simplified block diagram of the client-server network wherein the present invention is implemented according to an embodiment showing the network elements and connections involved when the destination client is not residing behind a firewall/NAT, and a data exchange session between the originating and destination clients has been established.

Now referring to FIG. 8, it can be seen that when originating client 105 receives a data exchange communications packet from operating application 130 of CMS 101, wherein the 'return' address and port number are those of pinhole 116, originating client 105 sends all further data exchange communications packets directly to the unique network address of destination client 106.

In this manner, data exchange communications path 119 is established, through which exchange of communications data packets between originating client 105 and destination client 106 occurs without further handling of those data packets by CMS 101.

From the description provided herein, a person reasonably skilled in the art will understand how the present invention is implemented, and how it operates in practice.

Based on the foregoing, the article and method of the present invention have been disclosed. However, numerous modifications and substitutions can be made without deviating from the scope of the present invention. Therefore, the present invention has been disclosed by way of illustration and not limitation, and reference should be made to the following claims to determine the scope of the present invention.

What is claimed is:

1. A method for establishing a data packet exchange communication session that allows the exchange of data packets between an originating client and a destination client in a data network having a client-server arrangement, the method comprising:
   receiving, at a communications management server, a communications session request data message transmitted through a first network firewall using a first temporary signaling communications path in the first network firewall from an originating client residing behind the first network firewall, said communications session request data message containing at least said unique network address of a destination client not residing behind the first network firewall;
   upon receiving said communications session request data message, said communications management server determining that said originating client is residing behind the first network firewall, and determining whether said first network firewall will allow exchange of media data packets between said originating client and any other client not residing behind said first network firewall; and
   if it is determined by the communications management server that the first network firewall will allow the direct bi-directional exchange of media data packets between said originating client and any other client not residing behind the first network firewall, the communications management server performing the steps of:
   retrieving a relationship information between a unique network address of said originating client and a unique network address of a first network firewall port and a first network firewall port identity; and
   converting said communications session request data message from said originating client into a format interpretable by said destination client;
   establishing a media data packet exchange communications session with said originating client through said first network firewall; and
   instructing said originating client to begin transmission of forward media data exchange packets to said destination client, said forward media data exchange packets being addressed to said unique network address of said destination client;
   otherwise, the communications management server performing the step of:
   establishing a media data packet exchange session with said originating client using, said first network firewall.

2. The method according to claim 1, wherein the originating client communicates via said data network with said communications management server only through the first network firewall that allows direct bi-directional exchange of media data packets.

3. The method according to claim 1, wherein each client and each server communicating via said data network has a unique network address.

4. The method according to claim 3, wherein the communications management server communicates via said data network with a plurality of clients, includes storage for storing the relationship information related to each of said client, and retrieves said information related to each known client.

5. The method according to claim 1, wherein the originating client communicates via said data network with said communications management server only through the first network firewall that allows direct bi-directional exchange of media data packets with the destination client, and the destination client communicates via said data network directly with said communications management server, without being required to communicate through a network firewall, said communications management server establishing a second media data packet exchange communications session that allows the exchange of media data packets with the destination client.

6. The method according to claim 5, wherein an individual signaling communication link between said originating client and said communications management server is established.

7. The method according to claim 6, wherein establishing an individual signaling communication link further comprises:
   said communications management server receiving a session request data message from said originating client, said session request data message being addressed to said communications management server, and said session request data message containing at least the unique network address of said originating client, wherein the first temporary signaling communications path between said communications management server and said originating client is caused to be created in response to the session request data message being addressed to said communications management server.

8. The method according to claim 7, wherein establishing an individual signaling communication link further comprises:
wherein a first network firewall port through which signaling data messages can be exchanged between said originating client, and said communications management server is assigned, said first network firewall port having the unique first network firewall address and first network firewall port identity.

9. The method according to claim 8, wherein establishing an individual signaling communication link further comprises:
prior to retransmission of said signaling data messages transmitted from said originating client through said first temporary signaling communications path to said communications management server, said signaling data messages received by said communications management server was repackaged to additionally include the unique first network firewall address and first network firewall port identity through which signaling data packets can be exchanged between said originating client and said communications management server.

10. The method according to claim 9, wherein establishing an individual signaling communication link further comprises:
upon receipt of first said repackaged signaling data message from said originating client via said first temporary signaling communications path, said communications management server examines said unique network address of said originating client and said unique first network firewall address of said first network firewall port, and determines that said originating client is communicating through said first network firewall when a comparison reveals a difference between said unique network address of said originating client and said unique first network firewall address of said first network firewall port, and said communications management server stores in said storage means a relationship between said unique network address of said originating client and said unique first network firewall address of said first network firewall port and said first network firewall port identity, said communications management server using said unique first network firewall address of said first network firewall port and said first network firewall port identity for all future signaling data messages transmitted to said originating client.

11. The method according to claim 1, wherein said communications management server performs the additional step of: converting information contained in media data packets received from said originating client into a format interpretable by said destination client not residing behind the first network firewall when said communications management server determines that the direct exchange of media data packets between said originating client and any other client not residing behind the first network firewall cannot be performed.

12. The method according to claim 11, wherein said communications management server establishes a media data packet communications session with said destination client not residing behind the first network firewall when said communications management server determines that the direct exchange of media data packets between said originating client and any other client not residing behind the first network firewall cannot be performed.

13. The method according to claim 12, wherein said communications management server transmits said converted media data packet to said destination client not residing behind the first network firewall.

14. The method according to claim 13, wherein said communications management server, upon receiving each media data packet from said destination client not residing behind the first network firewall, converting said media data packet from said destination client not residing behind the first network firewall into a format interpretable by said originating client residing behind the first network firewall and transmitting said converted media data packet to said originating client residing behind the first network firewall.

15. The method according to claim 14, wherein said communications management server, upon receiving a session termination data message from either said originating client residing behind the first network firewall client or said destination client not residing behind the first network firewall, closing said media packet exchange session between said originating client residing behind the first network firewall and said destination client not residing behind the first network firewall.

16. The method according to claim 15, wherein said communications managements server, upon receiving said session termination message from said originating client residing behind the first network firewall client or said destination client not residing behind the first network firewall, records statistical information regarding said media data packet exchange communications session between said originating client residing behind the first network firewall and said destination client not residing behind the first network firewall, said statistical information containing at least said unique network address of said originating client residing behind the first network firewall and said unique network address of said destination client not residing behind the first network firewall along with the start time and end time of said media data packet exchange communications session.

17. The method according to claim 1, wherein when the communications management server determines that the direct exchange of media data packets between said originating client residing behind the first network firewall and said destination client not residing behind said first network firewall cannot be performed because a predetermined amount of time has elapsed.

18. The method according to claim 1, wherein when the communications management server determines that the direct exchange of media data packets between said originating client residing behind the first network firewall and said destination client not residing behind said first network firewall cannot be performed because the first network firewall does not allow the direct exchange of media data packets between said originating client residing behind the first network firewall and the destination client not residing behind said first network firewall.

19. The method according to claim 1, wherein when it is determined by the communications management server that the first network firewall will allow the direct bi-directional exchange of media data packets between said originating client and any other client not residing behind the first network firewall, said communications management server communicates via said data network with said destination client not residing behind the first network firewall through a second network firewall having a unique second network firewall address and second network firewall port identity.

20. The method according to claim 19, further comprising:
establishing, between the destination client not residing behind the first network firewall and the communications management server not residing behind the first network firewall, a second temporary signaling communications path in the second network firewall.

21. The method according to claim 20, further comprising:
said communications management server, upon determining that said destination client not residing behind the first network firewall resides behind said second network firewall, determining whether said second network firewall will allow the direct exchange of media data packets between said destination client not residing behind the first network firewall and said originating client.

22. The method according to claim 21, further comprising:
when it is determined by the communication management server that the second network firewall will allow the direct bi-directional exchange of media data packets between said destination client not residing behind the first network firewall and said originating client, said media data packets from the destination client not residing behind the first network firewall being addressed to the unique second network firewall address and the second network firewall port identity.

23. The method according to claim 22, wherein a second individual signaling communication link between said destination client not residing behind the first network firewall and said communications management server is established.

24. The method according to claim 23, wherein establishing the second individual signaling communication link further comprises:
said communications management server receiving a session request data message from said destination client not residing behind the first network firewall, said session request data message being addressed to said communications management server, and said session request data message containing at least the unique network address of said destination client not residing behind the first network firewall, wherein the second temporary signaling communications path between said communications management server and said destination client not residing behind the first network firewall is caused to be created in response to the session request data message being addressed to said communications management server.

25. The method according to claim 24, wherein establishing the second individual signaling communication link further comprises:
wherein a second network firewall port through which signaling data messages can be exchanged between said destination client not residing behind the first network firewall, and said communications management server is assigned, said second network firewall port having the unique second network firewall address and second network firewall port identity.

26. A system for establishing a data packet exchange communication session that allows the exchange of data packets between an originating client and a destination client in a data network having a client-server arrangement comprising:
a communications management server receiving a communications session request data message transmitted through a first network firewall using a first temporary signaling communications path in the first network firewall from an originating client residing behind the first network firewall, said communications session request data message containing at least said unique network address of a destination client not residing behind the first network firewall;
said communications management server, upon receiving said communications session request data message, determining that said originating client is residing behind the first network firewall, and determining whether said first network firewall will allow exchange of media data packets between said originating client and any other client not residing behind said first network firewall; and
if it is determined by the communications management server that the first network firewall will allow the direct bi-directional exchange of media data packets between said originating client and any other client not residing behind the first network firewall, the communications management server performing the steps of:
retrieving a relationship information between a unique network address of said originating client and a unique network address of a first network firewall port and a first network firewall port identity; and
converting said communications session request data message from said originating client into a format interpretable by said destination client;
establishing a media data packet exchange communications session with said originating client through said first network firewall; and
instructing said originating client to begin transmission of forward media data exchange packets to said destination client, said forward data exchange packets being addressed to said unique network address of said destination client;
otherwise, the communications management server performing the step of:
establishing a media packet exchange session with said originating client using said first network firewall.

27. The system according to claim 26, wherein said communications management server communicates via said data network with the originating client only through the first network firewall that allows direct bi-directional exchange of media data packets.

28. The system according to claim 26, wherein each client and each server communicating via said data network has a unique network address.

29. The system according to claim 28, wherein the communications management server communicates via said data network with a plurality of clients, includes storage for storing the relationship information related to each of said client, and retrieves said information related to each known client.

30. The system according to claim 26, wherein said communications management server communicates via said data network with the originating client only through the first network firewall that allows direct bi-directional exchange of media data packets with the destination client, and said communications management server communicates using said data network directly with the destination client, without being required to communicate through a network firewall, said communications management server establishing a second media data packet exchange communications session that allows the exchange of media data packets with the destination client.

31. The system according to claim 30, wherein an individual signaling communication link between said originating client and said communications management server is established.

32. The system according to claim 31, wherein establishing an individual signaling communication link further comprises:
    said communications management server receiving a session request data message from said originating client, said session request data message being addressed to said communications management server, and said session request data message containing at least the unique network address of said originating client, the first temporary signaling communications path between said communications management server and said originating client is caused to be created in response to the session request data message being addressed to said communications management server.

33. The system according to claim 32, wherein establishing an individual signaling communication link further comprises:
    wherein a first network firewall port through which signaling data messages can be exchanged between said originating client, and said communications management server is assigned, said first network firewall port having the unique first network firewall address and first network firewall port identity.

34. The system according to claim 33, wherein establishing an individual signaling communication link further comprises:
    prior to retransmission of said signaling data messages transmitted from said originating client through said first temporary signaling communications path to said communications management server, said signaling data messages received by said communications management server was repackaged to additionally include the unique first network firewall address and first network firewall port identity through which signaling data packets can be exchanged between said originating client and said communications management server.

35. The system according to claim 34, wherein establishing an individual signaling communication link further comprises:
    upon receipt of first said repackaged signaling data message from said originating client via said first temporary signaling communications path, said communications management server examines said unique network address of said originating client and said unique first network firewall address of said first network firewall port, and determines that said originating client is communicating through said first network firewall when a comparison reveals a difference between said unique network address of said originating client and said unique first network firewall address of said first network firewall port, and said communications management server stores in said storage means a relationship between said unique network address of said originating client and said unique first network firewall address of said first network firewall port and said first network firewall port identity, said communications management server using said unique first network firewall address of said first network firewall port and said first network firewall port identity for all future signaling data messages transmitted to said originating client.

36. The system according to claim 26, wherein said communications management server converts information contained in data packets received from said originating client into a format interpretable by said destination client not residing behind the first network firewall.

37. The system according to claim 36, wherein said communications management server establishes a media data packet communications session with said destination client not residing behind the first network firewall when said communications management server determines that the direct exchange of media data packets between said originating client and any other client not residing behind the first network firewall cannot be performed.

38. The system according to claim 37, wherein said communications management server transmits said converted media data packet to said destination client not residing behind the first network firewall.

39. The system according to claim 38, wherein said communications management server, upon receiving each media data packet from said destination client not residing behind the first network firewall, converting said media data packet from said destination client not residing behind the first network firewall into a format interpretable by said originating client residing behind the first network firewall and transmitting said converted media data packet to said originating client residing behind the first network firewall.

40. The system according to claim 39, wherein said communications management server, upon receiving a session termination data message from either said originating client residing behind the first network firewall client or said destination client not residing behind the first network firewall, closing said media packet exchange session between said originating client residing behind the first network firewall and said destination client not residing behind the first network firewall.

41. The system according to claim 40, wherein said communications managements server, upon receiving said session termination message from said originating client residing behind the first network firewall client or said destination client not residing behind the first network firewall, recording statistical information regarding said data packet exchange communications session between said originating client residing behind the first network firewall and said destination client not residing behind the first network firewall, said statistical information containing at least said unique network address of said originating client residing behind the first network firewall and said unique network address of said destination client not residing behind the first network firewall along with the start time and end time of said data packet exchange communications session.

42. The system according to claim 26, wherein when the communications management server determines that the direct exchange of media data packets between said originating client residing behind the first network firewall and said destination client not residing behind said first network firewall cannot be performed because a predetermined amount of time has elapsed.

43. The system according to claim 26, wherein when the communications management server determines that the direct exchange of media data packets between said originating client residing behind the first network firewall and said destination client not residing behind said first network firewall cannot be performed because the first network firewall does not allow the direct exchange of data packets between said originating client residing behind the first network firewall and the destination client not residing behind said first network firewall.

44. The system according to claim 26, wherein when it is determined by the communications management server that the first network firewall will allow the direct bi-directional exchange of media data packets between said originating client and any other client not residing behind the first network firewall, said communications management server communicates via said data network with said destination client not residing behind the first network firewall through a second network firewall having a unique second network firewall address and second network firewall port identity.

45. The system according to claim 44, further comprising:
establishing, between the destination client not residing behind the first network firewall and the communications management server not residing behind the first network firewall, a second temporary signaling communications path in the second network firewall.

46. The system according to claim 45, further comprising:
said communications management server, upon determining that said destination client not residing behind the first network firewall resides behind said second network firewall, determining whether said second network firewall will allow the direct exchange of data packets between said destination client not residing behind the first network firewall and said originating client.

47. The system according to claim 46, further comprising:
when it is determined by the communication management server that the second network firewall will allow the direct bi-directional exchange of data packets between said destination client not residing behind the first network firewall and said originating client, said data packets from the destination client not residing behind the first network firewall being addressed to the unique second network firewall address and the second network firewall port identity.

48. The system according to claim 47, wherein a second individual signaling communication link between said destination client not residing behind the first network firewall and said communications management server is established.

49. The system according to claim 48, wherein establishing the second individual signaling communication link further comprises:
said communications management server receiving a session request data message from said destination client not residing behind the first network firewall, said session request data message being addressed to said communications management server, and said session request data message containing at least the unique network address of said destination client not residing behind the first network firewall, wherein the second temporary signaling communications path between said communications management server and said destination client not residing behind the first network firewall is caused to be created in response to the session request data message being addressed to said communications management server.

50. The system according to claim 49, wherein establishing the second individual signaling communication link further comprises:
wherein a second network firewall port through which signaling data messages can be exchanged between said destination client not residing behind the first network firewall, and said communications management server is assigned, said second network firewall port having the unique second network firewall address and second network firewall port identity.

* * * * *